(12) United States Patent
Perley et al.

(10) Patent No.: US 9,696,121 B1
(45) Date of Patent: Jul. 4, 2017

(54) LIGHTWEIGHT BALLISTIC ENCLOSURE

(71) Applicant: Hamilton Sundstrand Corporation, Charlotte, NC (US)

(72) Inventors: David Perley, Manchester, CT (US); Kenneth J. Trotman, Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/970,918

(22) Filed: Dec. 16, 2015

(51) Int. Cl.
  *H05K 5/00* (2006.01)
  *F41H 5/02* (2006.01)
  *G06F 1/16* (2006.01)

(52) U.S. Cl.
  CPC ............ *F41H 5/023* (2013.01); *G06F 1/1601* (2013.01)

(58) Field of Classification Search
  CPC .... G06F 1/1601; G06F 1/1613; G06F 1/1628; G06F 1/1633; G06F 1/1656; F41H 5/00; F41H 5/013; F41H 5/023; F41H 5/24; F41H 5/0478; F41H 5/08; F41H 1/02
  USPC ..................... 89/36.02; 361/679.01
  See application file for complete search history.

(56) References Cited

U.S. PATENT DOCUMENTS

| | | | |
|---|---|---|---|
| 6,161,738 A | 12/2000 | Norris | |
| 6,438,577 B1 | 8/2002 | Owens | |
| 7,763,125 B2 | 7/2010 | Shiflet et al. | |
| 7,921,757 B1 * | 4/2011 | Vavrick | F41H 1/02 2/2.5 |
| 8,406,082 B2 * | 3/2013 | Michaels | G08B 13/08 367/96 |
| 8,952,780 B2 * | 2/2015 | Simpson | A45C 13/10 206/1.5 |
| 9,027,810 B1 * | 5/2015 | Piersol | A45C 5/02 224/576 |
| 2002/0145849 A1 * | 10/2002 | Peterson, III | G06F 1/163 361/679.03 |
| 2009/0272662 A1 * | 11/2009 | Lin | A45C 11/18 206/320 |
| 2010/0024633 A1 | 2/2010 | Piscitelli | |
| 2012/0279875 A1 * | 11/2012 | Simpson | A45C 13/10 206/1.5 |
| 2014/0029194 A1 * | 1/2014 | Hayashi | H05K 7/20136 361/679.48 |
| 2016/0102951 A1 * | 4/2016 | Cole | F41H 5/24 361/679.34 |

* cited by examiner

*Primary Examiner* — Nidhi Thaker
(74) *Attorney, Agent, or Firm* — Cantor Colburn LLP

(57) ABSTRACT

An enclosure includes an enclosure body having an enclosure cavity, the enclosure body formed from a first material, and at least one ballistic tolerant plate disposed within the enclosure cavity to form a plurality of channel enclosures within the enclosure cavity, the at least one ballistic tolerant plate formed from a ballistic tolerant material.

9 Claims, 2 Drawing Sheets

LIGHTWEIGHT BALLISTIC ENCLOSURE

BACKGROUND

The subject matter disclosed herein relates to enclosures, and more particularly, to ballistic enclosures for computer assemblies.

Ballistic enclosures are used within aircraft and other vehicles to protect computer assemblies from damage caused by projectiles such as bullets. Computer assemblies utilized in aircraft or other vehicles may include redundant components to meet operational requirements. Often, redundant computer assemblies may require a ballistic enclosure for each computer component or a single ballistic enclosure fully formed from or completely surrounded by ballistic tolerant materials, both of which may add weight and cost to an aircraft or vehicle.

BRIEF SUMMARY

According to an embodiment, an enclosure includes an enclosure body having an enclosure cavity, the enclosure body formed from a first material, and at least one ballistic tolerant plate disposed within the enclosure cavity to form a plurality of channel enclosures within the enclosure cavity, the at least one ballistic tolerant plate formed from a ballistic tolerant material.

According to an embodiment, a multi-channel computer assembly includes an enclosure, the enclosure including an enclosure body having an enclosure cavity, the enclosure body formed from a first material, and at least one ballistic tolerant plate disposed within the enclosure cavity to form a plurality of channel enclosures within the enclosure cavity, the at least one ballistic tolerant plate formed from a ballistic tolerant material, and a multichannel computer including a plurality of computer components each disposed within the respective plurality of channel enclosures.

Technical function of the embodiments described above includes the enclosure body formed from a first material, and at least one ballistic tolerant plate disposed within the enclosure cavity to form a plurality of channel enclosures within the enclosure cavity, the at least one ballistic tolerant plate formed from a ballistic tolerant material.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
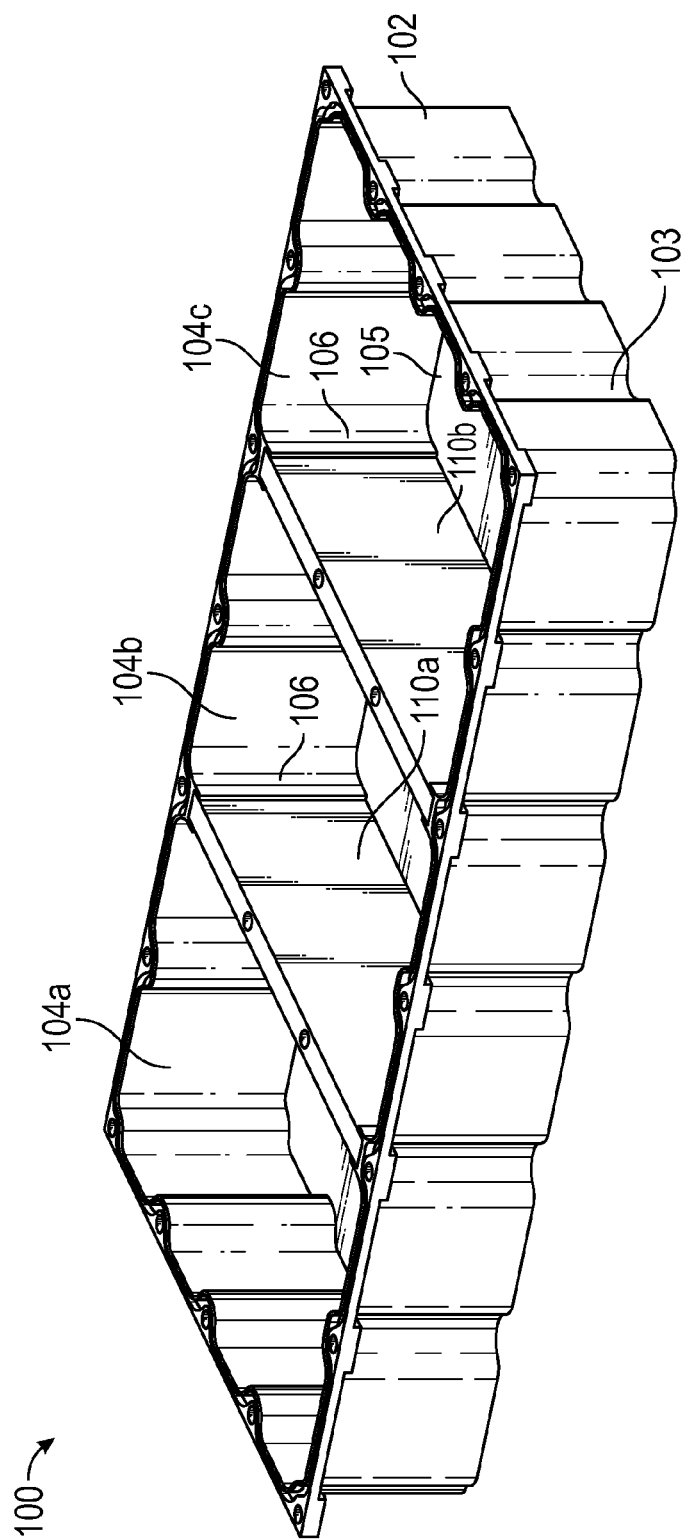
FIG. 1 is an isometric view of one embodiment of an enclosure.

Referring to the drawings, FIG. 1 shows an enclosure 100. In the illustrated embodiment, the enclosure 100 includes an enclosure body 102, ballistic tolerant plates 110a, 110b, and multiple component enclosures 104a-104c. In the illustrated embodiment, the enclosure body 102 is formed from a light weight material while utilizing ballistic tolerant plates 110a, 110b that may be formed from heavier materials to withstand impact from a projectile. In the illustrated embodiment, the enclosure 100 can protect computer components 112a-112c (shown in FIG. 2) while minimizing the weight of the enclosure 100.

In the illustrated embodiment, the enclosure body 102 is formed from a lightweight material to minimize total weight of the enclosure 100. In the illustrated embodiment, materials for the enclosure body 102 can be selected to minimize weight while providing a desired level of strength. In the illustrated embodiment, the enclosure body 102 is not required to withstand an impact from a projectile, such as a bullet. In the illustrated embodiment, the enclosure body 102 can be formed from metals, such as aluminum or magnesium, plastics, or composites.

In the illustrated embodiment, the enclosure body 102 forms an enclosure cavity 105. In certain embodiments, the bottom and sides of the enclosure cavity 105 are integrally formed from the same material. In the illustrated embodiment, the enclosure cavity 105 is formed to contain electrical components, such as computer components 112a-112c (shown in FIG. 2). In the illustrated embodiment, the enclosure body 102 can further include features such as ribs 103. In the illustrated embodiment, the ribs 103 can provide structural rigidity to the enclosure body 102. In certain embodiments, the ribs 103 can engage with features of the computer components 112a-112c to locate the computer components 112a-112c within the enclosure cavity 105.

In the illustrated embodiment, the enclosure body 102 can include at least one retaining feature 106 to retain the ballistic tolerant plates 110a,110b within the enclosure cavity 105. The retaining features 106 can include slots, friction modified areas, or any other suitable retaining feature. In certain embodiments, the retaining feature 106 can include an area to allow for bonding or fastening of the ballistic tolerant plates 110a,110b to the enclosure body 102. In the illustrated embodiment, the ballistic tolerant plates 110a, 110b slide into the retaining feature 106 slots. Advantageously, the ballistic tolerant plates 110a, 110b can easily be removed to provide access to the components within the enclosure cavity 105 or allow for replacement of the ballistic tolerant plates 110a,110b if damaged.

In the illustrated embodiment, the ballistic tolerant plates 110a,110b can be inserted into the enclosure cavity 105. Advantageously, the ballistic tolerant plates 110a, 110b can stop or absorb energy from projectiles, such as bullets, to prevent the projectile from going beyond the ballistic tolerant plate 110a,110b. In the illustrated embodiment, the ballistic tolerant plates 110a, 110b can be formed of steel, composites, or any other suitable ballistic tolerant material. In certain embodiments, the parameters of the ballistic tolerant plates 110a, 110b are selected based on operating parameters, such as desired weight, cost, expected projectile size, speed and energy. In certain embodiments, the geometric and material characteristics of the ballistic tolerant plates 110a, 110b are selected based on the operating parameters.

In the illustrated embodiment, the ballistic tolerant plates 110a,110b, when inserted into the retaining features 106, can divide the enclosure cavity 105 into multiple component enclosures 104a-104c. In certain embodiments, the enclosure 100 can include any suitable number of ballistic tolerant plates and form any suitable number of component enclosures. Advantageously, the ballistic tolerant plates 110a, 110b can form multiple component enclosures 104a-104c with ballistic tolerant material between the enclosures to prevent a projectile from traversing between the component enclosures 104a-104c.

Figure 2:
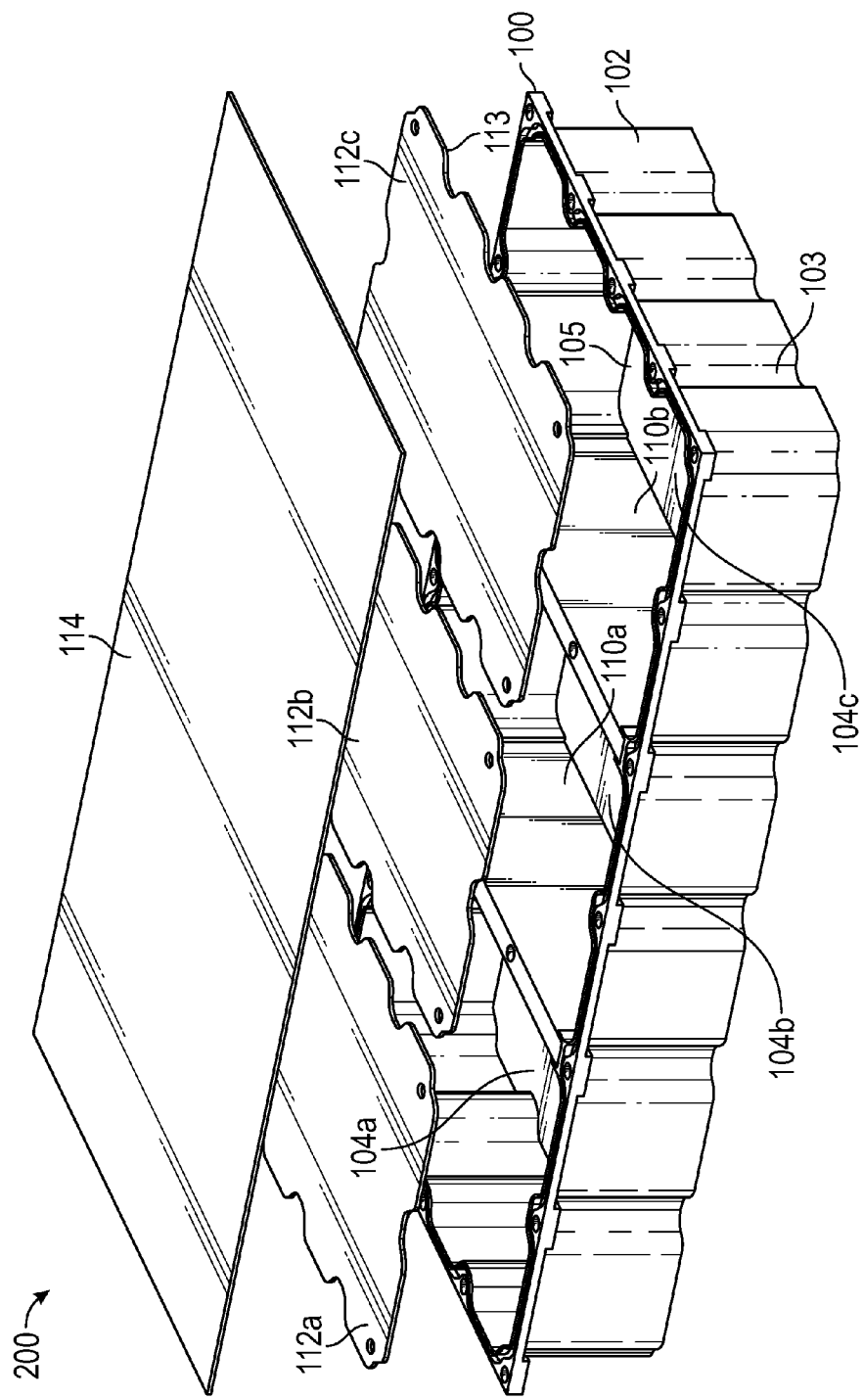
FIG. 2 is an exploded view of multichannel computer system utilizing the enclosure of FIG. 1.

Referring to FIG. 2, a multi-channel computer system 200 is shown. In the illustrated embodiment, the multi-channel computer system 200 is enclosed within the enclosure 100 previously described. In the illustrated embodiment, the multi-channel computer system 200 includes a plurality of computer components 112a-112c. The plurality of computer components 112a-112c can be redundant computer components that provide the same functionality in case of failure or malfunction of a single component. In certain applications, the use of redundant computer components is required by operational and industry standards. In the illustrated embodiment, the computer components 112a-112c can perform any suitable function, such as flight control, weapons control, etc. In certain embodiments, the multi-channel computer system 200 can include any suitable number of redundant components.

In the illustrated embodiment, the computer components 112a-112c are disposed within the component enclosures 104a-104c. In certain embodiments, the computer components 112a-112c can contain notched features 113 to locate and align the computer components 112a-112c within the enclosure body 102. The notched features 113 can be geometric shapes or reliefs corresponding to features of the enclosure body 102 to prevent movement or vibration in one or more directions. Further, the notched features 113 can allow for an installer to properly orient the computer components 112a-112c within the enclosure body 102. In certain embodiments, the notched features 113 of the computer components 112a-112c can engage with the ribs 103 of the enclosure body 102.

In certain applications, operational, industrial, or safety guidelines require that the multi-channel computer system 200 can withstand projectiles, such as bullets. In the illustrated embodiment, the layout of the ballistic tolerant plates 110a,110b prevents a projectile from damaging more than one redundant computer component 112a-112c, even if the projectile breaches the enclosure body 102. In the illustrated embodiment, the computer components 112a-112c are arranged horizontally within the enclosure body 102 with ballistic tolerant plates 110a,110b disposed there between, which may allow a projectile to damage a single computer component 112a, but will not allow the projectile to traverse the ballistic tolerant plates 110a,110b to damage a second computer component 112b,112c.

In the illustrated embodiment, the redundant components 112a-112c can continue to perform desired functionality, even if one computer component 112a is damaged. Advantageously, a single projectile may not disable all redundant computer components 112a-112c enclosed within the enclosure 100. Therefore, the enclosure 100 can provide ballistic protection for computer components 112a-112c with reduced cost, weight, and simplified installation.

In the illustrated embodiment, a cover 114 can be located above the enclosure cavity 105 to enclose the enclosure cavity 105 and contain the computer components 112a-112c. In the illustrated embodiment, the cover 114 is formed from a material similar to the enclosure body 102, such as lightweight metal, such as aluminum or magnesium, a plastic, or a composite.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A multi-channel computer assembly, comprising:
   an enclosure, comprising:
      an enclosure body having an enclosure cavity, the enclosure body formed from a first material; and
      at least one ballistic tolerant plate disposed within the enclosure cavity to form a plurality of channel enclosures within the enclosure cavity, the at least one ballistic tolerant plate formed from a ballistic tolerant material, wherein the plurality of channel enclosures includes a first channel enclosure and a second channel enclosure; and
   a multichannel computer including a plurality of redundant computer components each disposed within the respective plurality of channel enclosures, wherein the plurality of redundant computer components includes a first redundant computer component and a second redundant computer component;
   wherein the at least one ballistic tolerant plate forms at least part of a first channel enclosure and at least part of a second channel enclosure, the first redundant computer component is disposed in the first channel enclosure, and the second redundant computer component is disposed in the second channel enclosure.

2. The multi-channel computer assembly of claim 1, the enclosure body further including at least one retaining feature to engage the at least one ballistic tolerant plate.

3. The multi-channel computer assembly of claim 1, wherein the at least one ballistic tolerant plate is bonded to the enclosure body.

4. The multi-channel computer assembly of claim 1, wherein the at least one ballistic tolerant plate is fastened to the enclosure body.

5. The multi-channel computer assembly of claim 1, the enclosure body further including at least one rib.

6. The multi-channel computer assembly of claim 5, wherein at least one computer components of the plurality computer components includes a notch to interface with the at least one rib of the enclosure body.

7. The multi-channel computer assembly of claim 1, wherein the first material includes at least one of aluminum, plastic, and composite material.

8. The multi-channel computer assembly of claim 1, wherein the ballistic tolerant material includes at least one of steel, and composite material.

9. The multi-channel computer assembly of claim 1, further comprising a cover to enclose the enclosure cavity.

* * * * *